US006872443B2

(12) United States Patent
Franke

(10) Patent No.: US 6,872,443 B2
(45) **Date of Patent: *Mar. 29, 2005**

(54) TRANSFER FOR DECORATING TEXTILES WITH COLORED PATTERNS

(75) Inventor: Kell Erik Franke, Copenhagen (DK)

(73) Assignee: Relex Holding A/S, Drammen (NO)

(*) Notice: Subject to any disclaimer, the term of this patent is extended or adjusted under 35 U.S.C. 154(b) by 0 days.

This patent is subject to a terminal disclaimer.

(21) Appl. No.: 10/326,319

(22) Filed: Dec. 20, 2002

(65) Prior Publication Data

US 2003/0134113 A1 Jul. 17, 2003

Related U.S. Application Data

(62) Division of application No. 09/091,704, filed as application No. PCT/DK96/00535 on Dec. 16, 1996, now Pat. No. 6,521,327.

(30) Foreign Application Priority Data

Dec. 14, 1995 (DK) .............................................. 1417/95

(51) Int. Cl.$^{7}$ .............................. B32B 3/00; B32B 7/14

(52) U.S. Cl. .................... 428/201; 428/423.1; 428/480; 428/500

(58) Field of Search ............................. 428/201, 423.1, 428/480, 500, 32.1

(56) References Cited

U.S. PATENT DOCUMENTS 4,773,953 A 9/1988 Hare .......................... 156/240
5,916,399 A * 6/1999 Olsen .......................... 156/230
6,521,327 B1 * 2/2003 Franke .......................... 428/201
2003/0091799 A1 * 5/2003 Franke .......................... 428/195

FOREIGN PATENT DOCUMENTS

| | | |
|---|---|---|
| WO | WO 86/01097 | 2/1986 |
| WO | WO 92/07990 | 5/1992 |

* cited by examiner

*Primary Examiner*—B. Shewareged
(74) *Attorney, Agent, or Firm*—Merchant & Gould P.C.

(57) ABSTRACT

A transfer capable of applying one- or multi-colored patterns to textiles under heat and pressure comprises a carrier sheet (1) having a non-binding surface which carries
(a) a one- or multi-colored pattern (5) printed on the carrier sheet using a digitally controlled color printer;
(b) a transparent (6) or white-pigmented (7) elastomer layer of a polymer having a high plasticizing point printed configuratively on the pattern (5); and
(c) a heat-activatable thermoplastic polymeric glue layer (8) printed configuratively on the transparent (6) or white-pigmented (7) elastomer layer or a heat-activatable hot melt granulate sprinkled on the elastomer layer while said layer was still wet.

An even better encapsulation of the colored pattern is obtained when the carrier sheet has printed thereon a first transparent elastomer layer of a polymer having a high plasticizing point, and the pattern is printed on this elastomer layer using a digitally controlled color printer. Additional strength is obtained when both a transparent elastomer layer and a white-pigmented elastomer layer are printed on top of the colored pattern.

31 Claims, 1 Drawing Sheet

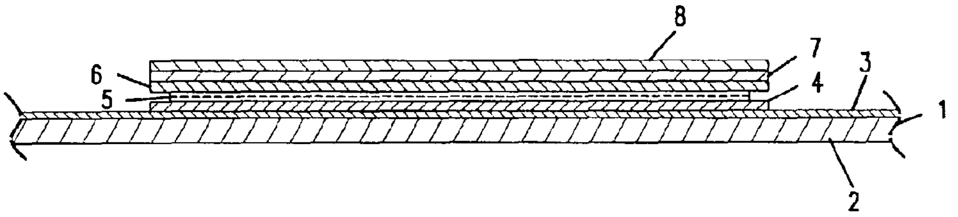
8
7
6
5
4
3
1
2

TRANSFER FOR DECORATING TEXTILES WITH COLORED PATTERNS

This application is a divisional of application Ser. No. 09/091,704, filed Oct. 13, 1998, now U.S. Pat. No. 6,521, 327 which is a National stage of PCT/DK96/00535, filed on Dec. 16, 1996, which application(s) are incorporated herein by reference.

The invention relates to a heat application transfer for decorating textiles with coloured patterns having a particularly high washing and cleaning fastness, wherein the design is produced by means of a digitally controlled colour printer.

BACKGROUND OF THE INVENTION

The most common way of making transfers for the application on textiles is by means of silk screen printing where each individual colour is applied to a sheet of silicone paper. Some colours, such as vinyl and plastisol colours, are heat-activatable, but are then not very fast without further treatment. To improve the fastness, the colours are usually provided with a hot melt granulate layer in the form of a powder or a fine-grained granulate mixed in an extender base, which is applied to the colours and serves as a special glue layer between textile and colours, thereby considerably improving the fastness. At high temperatures, however, e.g. during tumbling processes which use temperatures up to 140° C. in certain cases, they will get loose from the textile or a possible glue layer. Solvent-based two-component colours will be more stable against the action of temperature, but, when having been subjected to industrial washing and tumbling for an extended period of time, they will dry out and peel off from the textile.

The international patent application WO 92/07990 discloses a possible use of a colour copier with a two-component colour toner system in the making of a transfer for textiles. Such a two-component colour toner system, however, is not known in the market for colour copiers today. The present laser colour copiers use colour toners of a one-component thermoplastic resin type where no polymerization takes place. Furthermore, the system described in the above-mentioned international application depends on a colourless two-component extender base layer which is applied on top of the coloured image and, immediately when wet, is coated with a thermoplastic granulate which serves as a glue layer. This embodiment, however, can only be applied to white textiles, and the transferred image will only be sharp on very smooth textiles.

It is prior art to use colour copiers for the transfer of images to a thermoplastics-coated transfer paper from which it can be transferred by heat and pressure to white cotton textiles. The known products, however, exhibit great washing and cleaning weaknesses and thus just stand washing at about 40° C. for a limited number of times. The reason is primarily that the colour toners are relatively unprotected against mechanical impacts, and that they remain heat-activatable already at temperatures from about 90° C. Further, printing is only possible on white textiles, and only on textiles where the predominant part consists of cotton. If it is desired to transfer colour images of this type to dark textiles, up to several additional operations are required for the lamination and adaptation of a white cover layer below the colour toners. This process is both expensive and time-consuming, and it is moreover not possible to make configurative patterns, but only complete cover faces.

OBJECT OF THE INVENTION

A number of data-controlled colour printers of various types are available which reproduce four-coloured raster images with a resolution of 400 dpi or more with an almost photographic appearance. It is not possible in a pure silk screen printing process to achieve a resolution of more than 100 dpi, and consequently fine details are lost in the reproduction. Accordingly, it would be a great advantage to be able to use such colour printers for the making of coloured and particularly multi-coloured configurative transfers for the textile industry. Of course, it would also be an advantage to be able to use data programs for the editing of images and designs together with scanners which transfer original images to data.

The object of the invention is to make a coloured configurative transfer for the textile industry which combines the great advantages achieved by the use of an electronic colour printer as the graphic unit with particularly great washing and cleaning fastness.

SUMMARY OF THE INVENTION

Since colour images generated from ordinary printers to a transfer substrate cannot readily be transferred to a textile in a configurative pattern, this is achieved according to the invention by using silk screen printing processes for making a protective layer and/or cover layer as well as a glue layer in accordance with the invention.

In its most simple embodiment the transfer of the invention is unique in that it comprises a carrier sheet having a non-binding surface which carries (a) a one- or multi-coloured pattern printed on the carrier sheet using a digitally controlled colour printer;

(b) a transparent or white-pigmented elastomer layer of a polymer having a high plasticizing point printed configuratively on the pattern; and (c) a heat-activatable thermoplastic polymeric glue layer printed configuratively on the transparent or white-pigmented elastomer layer, or a heat-activatable hot melt granulate sprinkled on the elastomer layer while this was still wet.

It has surprisingly been found according to the invention that the colour toners which are usually used in multi-colour copiers and which may e.g. be based on thermoplastic polyol resins, migrate into the surface of the applied transparent or white-pigmented elastomer layer and harden together with said layer under the action of the isocyanate hardener contained in the elastomer layer. The colour toners hereby lose their thermoplastic nature and remain adhered to the elastomer layer, so that the coloured pattern or the image, after the transfer has been applied to a textile, stands washing, also at elevated temperatures.

If it is desired to encapsulate the coloured pattern or image so that it will be additionally resistant to wear and to the action of washing and cleaning, it may be provided with an additional protective layer. In this embodiment the transfer of the invention is unique in that it comprises a carrier sheet having a non-binding surface which carries (a) a first transparent elastomer layer of a polymer having a high plasticizing point printed configuratively on the carrier sheet;

(b) a one- or multi-coloured pattern printed on the first elastomer layer using a digitally controlled colour printer;

(c) a second transparent or white-pigmented elastomer layer of a polymer having a high plasticizing point printed configuratively on the pattern; and (d) a heat-activatable thermoplastic polymeric glue layer printed configuratively on the transparent or white-pigmented elastomer layer, or a heat-activatable hot melt granulate sprinkled on the elastomer layer while this was still wet.

Further, if the transfer is intended to be applied to very coarse or uneven textiles, and if it is desired to maintain fine details in the coloured pattern or image, the transfer may be provided with both a white-pigmented and a transparent elastomer layer (c); in this case the very strongest encapsulation of the coloured pattern or image is achieved when first a transparent elastomer layer and then a white-pigmented elastomer layer are applied.

In the latter embodiment the transfer of the invention is unique in that it comprises a carrier sheet having a non-binding surface which carries (a) a first transparent elastomer layer of a polymer having a high plasticizing point printed configuratively on the carrier sheet;

(b) a one- or multi-coloured pattern printed on the elastomer layer using a digitally controlled colour printer;

(c) a second transparent elastomer layer of a polymer having a high plasticizing point printed configuratively on the pattern;

(d) a white-pigmented elastomer layer of a polymer having a high plasticizing point printed configuratively on the second transparent elastomer layer; and (e) a heat-activatable thermoplastic polymeric glue layer printed configuratively on the white-pigmented elastomer layer, or a heat-activatable hot melt granulate sprinkled on the elastomer layer while this was still wet.

The carrier sheet having a non-binding surface may e.g. consist of paper or a heat-resistant plastics sheet, e.g. of polyester, coated with a thin layer of silicone or polyolefin; or it may e.g. consist of a polyolefin sheet, expediently a sheet of high density (HD) polypropylene.

The transparent elastomer layers may advantageously consist of an elastomeric polyurethane having a high plasticizing point applied in the form of a solution in an organic solvent. This is particularly advantageous in connection with the use of colour copiers of the dry electrostatic type which normally apply a thin silicone oil to the surface of the fixing rollers to prevent toner particles from sticking to the rollers. Small amounts of this silicone oil are applied to the colour toners in the printing and can be detrimental to the adhesion of the subsequent elastomer layer. But the organic solvent in the polyurethane layer dissolves the silicone film so that the polyurethane and the toners combine to form a homogeneous unit.

However, with other types of colour printers, or if other steps are taken to avoid the silicone film, it is also possible to use corresponding polyurethanes in aqueous solution.

The white elastomer layer, which may optionally be omitted if the transfer is to be used for applying a pattern to white textiles, may advantageously consist of the same type of polyurethane as above, pigmented with a white inorganic pigment and applied from an organic or aqueous solution.

The final glue layer may advantageously consist of polyurethane thermoplastics having a plasticizing point in the range 120–160° C. containing dispersed fine particles of a hot melt of copolyamide or high density polyethylene type having a melting point of 100–140° C. in the ratio 1:1, applied in the form of an organic or aqueous solution of the polyurethane with dispersed hot melt powder.

A special variation of the glue layer comprises laminating a thermoplastic moulded polyurethane sheet on the transparent or white elastomer layer. A 100 $\mu$m thick transparent or coloured aromatic polyester film having a plasticizing point of about 160° C., a hardness of 93° Shore and an elasticity of 400% is particularly useful for the purpose. The silk screen printed polyurethane layers and the polyurethane sheet can be laminated together at 160° C. under slight pressure, so that the sheet does not melt, but only adheres to the applied layer. During application of the finished transfer to a textile, which takes place at 200° C. and 320 kPa in 12 seconds, the polyurethane sheet melts and forms a very strong glue layer between the textile and printed image.

In an advantageous embodiment of the invention, the transparent elastomer layers, the white elastomer layer and the glue layer are printed on the carrier sheet by silk screen printing processes in the same register and configuration on top of one another. Owing to possible inaccuracies in the register, however, the glue layer normally protrudes 1–2 mm beyond the configuration of the other layers in practice.

As stated, the one- or multi-coloured pattern is printed on the first elastomer layer using a digitally controlled colour printer. The invention is very flexible with respect to the selection of colour printer. A rough distinction may be made between digitally controlled colour printers which work with powder toners, liquid dyes or colour ribbons.

Accordingly, the coloured pattern in a transfer of the invention will normally be printed on the first transparent elastomer layer by means of a dry electrostatic colour toner printer, an ink jet printer with liquid dye or a thermotransfer colour printer, all of which are digitally controlled.

The invention also comprises a method of making a transfer as described above, said method being unique by, on a carrier sheet having a non-binding surface, (a) printing a one- or multi-coloured pattern using a digitally controlled colour printer;

(b) on top of the pattern, configuratively printing a transparent or white-pigmented elastomer layer of a polymer having a high plasticizing point; and (c) on top of the transparent or white-pigmented elastomer layer, printing a heat-activatable thermoplastic polymeric glue layer, or, while the elastomer layer is still wet, sprinkling a heat-activatable hot melt granulate on said layer.

Another embodiment of the method of the invention is unique by, on a carrier shet (1) having a non-binging surface, (a) configuratively printing a first transparent elastomer layer (4) of a polymer having a high plasticizing point;

(b) on top of the first elastomer layer (4), printing a one- or multi-coloured pattern (5) using a digitally controlled colour printer;

(c) on top of the pattern (5), configuratively printing a second transparent (6) or white-pigmented (7) elastomer layer of a polymer having a high plasticizing point; and (d) on top of the transparent (6) or white-pigmented (7) elastomer layer, configuratively printing a heat-activatable thermoplastic polymeric glue layer (8), or, while the elastomer layer is still wet, sprinkling a heat-activatable hot melt granulate on said layer.

Another embodiment of the method of the invention is unique by, on a carrier sheet having a non-binding surface, (a) configuratively printing a first transparent elastomer layer of a polymer having a high plasticizing point;

(b) on top of the first elastomer layer, printing a one- or multi-coloured pattern using a digitally controlled colour printer;

(c) on top of the pattern, configuratively printing a second transparent elastomer layer of a polymer having a high plasticizing point;

(d) on top of the second elastomer layer, configuratively printing a white-pigmented elastomer layer of a polymer having a high plasticizing point; and (e) on top of the white-pigmented elastomer layer, configuratively printing a heat-activatable thermoplastic polymeric glue layer, or, while the elastomer layer is still wet, sprinkling a heat-activatable hot melt granulate on said layer.

In accordance with the disclosure above, the transparent elastomer layers are advantageously applied in the form of an organic solution of an elastomer polyurethane having a high plasticizing point; but it may also take place in the form of an aqueous solution.

The white elastomer layer may then be applied in the form of a corresponding organic or aqueous polyurethane solution which is pigmented with a white pigment.

Furthermore, the glue layer may advantageously be applied in the form of an organic or aqueous solution of polyurethane thermoplastics having a plasticizing point in the range 120–160° C., in which a fine hot melt powder of copolyamide or high density polyethylene type having a melting point of 100–140° C. is dispersed in the ratio 1:1.

In an advantageous embodiment of the method of the invention, the transparent elastomer layers, the white elastomer layer and the glue layer are printed on the carrier sheet by silk screen printing processes in the same register and configuration on top of one another. But, as mentioned before, owing to possible inaccuracies in the register, the glue layer will normally be printed in a configuration which protrudes 1–2 mm beyond the configuration of the other layers.

Furthermore, the coloured pattern is generally printed on the first transparent elastomer layer by means of a dry electrostatic colour toner printer, an ink jet printer with liquid dye or a thermotransfer colour printer, all of which are digitally controlled.

According to the invention, if the transfer is to be used for applying a pattern to white textiles, it is possible to omit the white elastomer layer and to print the glue layer directly on the second transparent elastomer layer.

According to the invention, if the transfer is to be used for applying a pattern to textiles having a very even and non-textured surface, it is also possible to omit the second transparent elastomer layer and to print the white elastomer layer directly on the one- or multi-coloured pattern.

Finally, according to the invention, it is also possible to omit the glue layer and, where application to white textiles is involved, optionally also the white elastomer layer, in which case the surface of the white elastomer layer and the second transparent elastomer layer, respectively, are modified to be heat-activatable. This is done most expediently according to the invention in that immediately after the printing of the elastomer layer, while this is still wet, a fine hot melt powder of copolyamide or high density polyethylene type having a melting point of 100–140° C. is sprinkled on the surface.

The invention also comprises textile products on which a one- or multi-coloured pattern is attached by application from a transfer of the invention.

The method and the transfer of the invention give evident cost-saving advantages particularly in case of a low number of printed copies.

DETAILED DESCRIPTION OF THE INVENTION

The invention will be illustrated more fully by the following detailed description of various embodiments of it with reference to the drawing, which schematically shows the structure of a transfer of the invention.

The drawing shows a carrier sheet (1) composed of a sheet of paper or a heat-resistant plastics sheet (2) coated with a thin release layer of silicone or polyolefin (3). A first transparent elastomer layer (4) is configuratively printed by silk screen printing on the silicone or polyolefin surface, and, on top of said elastomer layer, a one- or multi-coloured pattern (5) is printed with a digitally controlled colour printer. On top of the coloured pattern, a second transparent elastomer layer (6) is configuratively printed, again by silk screen printing, and, in the same manner, a white-pigmented elastomer layer is printed on said second elastomer layer. Uppermost, a heat-activatable thermoplastic polymeric glue layer (8) is printed in the same manner.

A thin transparent elastomer layer (4), e.g. an organic solution of an elastomeric polyurethane having a high plasticizing point, is applied by silk screen printing with a 34T blanket in a desired configuration on a carrier sheet (1) having a non-binding surface, e.g. of paper or heat-resistant plastics sheet (2) coated with silicone or polyolefin (3) or entirely of polyolefin, e.g. HD polypropylene. This first elastomer layer (4) is then dried in an infrared/hot air drying tunnel at about 70–80° C.

The desired pattern (5) is now printed in mirror-inverted fashion on the carrier sheet (1) with applied elastomer layer (4) within the elastomer-coated area by means of a colour printer, e.g. a four-colour copier of the “Ricoh NC5006” type, which works with a dual powder toner system and a resolution of 400 dpi. After the print has been fixed in the heat section of the machine, the toners, which consist of thermoplastics, are still heat-activatable even at relatively low temperatures (about 90° C.). To stabilize the toners so that they can later stand higher temperatures, a second transparent elastomer layer (6) is printed on top of the colour toners, e.g. of the same polyurethane solution as the elastomer layer (4). The solvent of the polyurethane layer neutralizes the silicone film, which is applied to the toners during the heat fixation in the colour copier, and the polymer/isocyanate mixture combines with the toners to form a homogeneous unit which hardens at room temperature by means of the atmospheric humidity. A well protected colour layer has now been provided between two polyurethane layers which are not heat-activatable at the application temperature of the transfer.

Since the covering power of the toners is none too good on others than white textiles, a white-pigmented elastomer layer (7), e.g. of a polyurethane with the same chemical composition as the preceding transparent layers and in the same configuration as the other layers, is now applied. A heat-activatable granulate of a polyamide-based hot melt, which serves as a glue layer between the transfer and the substrate, may now be applied to the elastomer layer (7) while it is still wet, or a heat-activatable thermoplastic polymeric glue layer (8), e.g. consisting of heat-activatable polyurethane thermoplastics mixed with a fine hot melt powder of copolyamide in the ratio 1:1, is applied to the white cover layer (7).

The transfer may now be applied to all ordinary textiles in the usual manner at 170–180° C. in 8–12 seconds and a pressure of about 310 kPa.

With respect to useful colour printers, a rough distinction may be made between digitally controlled colour printers working with powder toners, liquid dyes or colour ribbons. Examples of colour copiers using powder toners in a dry electrostatic process, include: “Canon® CLC 700”, “Ricoh® NC 5006”, and “Rank Xerox® 5775”. Examples of digitally controlled colour printers using liquid dyes include: “Indigo Eprint 1000”, “IBM Color Jetprinter PS 4079” and “Canon® BJC-880”. Finally, examples of digitally controlled so-called thermotransfer colour printers working with colour ribbons include: “ABDICK”, “Seiko® ColorPoint 2 PSF-14” and “Fargo Pictura 310”.

Each system has its cost/quality parameters between which one may choose freely. The elastomer layers encapsulating the colour layer may be adapted to the various printers e.g. by means of surface-active additives or electronic surface treatment. This applies to both water-based and solvent-based polymers. If, however, liquid dyes are used, waterproof dyes will always be preferred.

Modern digitally controlled colour printers are compatible with a number of standard software editing programs, e.g. Windows 3.X, IBM OS/2, Apple System 6 and 7 as well as the more advanced Adobe Postscript Level 2.

Preferred polymers having a high plasticizing point for making the elastomer layers (4), (6) and (7) are elastomeric polyurethanes, such as a one-component fully reacted linear polyurethane on the basis of polyester and aliphatic diisocyanate or a one-component fully reacted polyurethane on the basis of polyester and aromatic diisocyanate. The thermoplastic polymer for use in the glue layer (8) is preferably a corresponding polyurethane adjusted to have a lower plasticizing point and thus to be heat-activatable together with the hot melt powder.

Examples of other useful elastomer systems include two-component polyurethane textile colours e.g. "Bargoscreen. S18/50" from the company Aaberg or "Maraflor TK" from the company Marabu. These colour systems consist of 1-methoxy-2-propyl acetate and 3-methoxy-n-butyl acetate to which polyurethane binders are added. Diisocyanate is used as a binder. The recommended diluents for these systems—cyclohexanone or ethyl glycol acetate—are relatively aggressive against the toners in the image layer and must therefore be added in as small amounts as possible, while the carrier sheet should be treated carefully without greater mechanical impacts until the elastomer layer on the toners has dried.

It should be stressed that, in addition to said polyurethane components, a large number of other thermoplastic resins may also be used, such as e.g. polyolefins, ethylene vinyl acetate copolymers, ethylene ethyl acrylate copolymers, ethylene acrylic acid copolymers, ionomers, polyesters, polyamides, acrylic resins, etc.

When using elastomer systems which are water-dispersed and therefore do not contain solvents, washing may give rise to separation problems between the toner layer and the subsequently applied transparent layer. The reason is that colour copiers of the dry electrostatic type normally use a thin silicone oil on the surface of the fixing rollers which prevents toner particles from sticking to the rollers. It is inevitable that small amounts of silicone oil are left on the surface of the colour toners and cause separation or formation of air pockets between the toner layer and the subsequently applied polyurethane layer, particularly during washing. If it is desired to use a water-based colour/lacquer system, the problem may be solved by using infrared heat fixing of the toners alone, or ceramic fixing rollers, or other rollers which do not require silicone oil.

Preferred Method of Preparation:

As will appear from the drawing, several successive polymer and image layers, which form the finished transfer, are printed individually on a carrier sheet (1) normally consisting of a sheet of paper of about 105 g/m$^2$ (2) coated with a release layer of silicone (3).

First a transparent elastomer layer (4) is printed, preferably consisting of a polyurethane having the highest possible melting point, which following transfer to the substrate forms a protective top layer. Particularly useful was a 25% solution in propylene glycol methyl ether of a linear fully reacted polyurethane on the basis of polyester and aliphatic diisocyanate having a plasticizing point of 195–205° C.

Then the desired image (5) is printed in a dry electrostatic colour copier. A particularly suitable colour copier is a "Ricoh NC5006" which produces colour copies with a resolution of 400 dpi with 256 shades per point. In other colour copiers, the copying paper runs about a drum, and this restricts the selection of copying materials. NC5006 therefore uses a transfer belt for transferring the original image to the copying sheet. The straight paper movement allows copying on different types of paper and transparencies.

A transparent elastomer layer (6) is now printed, said layer combining with the toners and consisting of the same composition as the first elastomer layer (4). The toners are now well protected between the two elastomer layers. Then, a white cover layer (7) is printed, consisting of the same polyurethane type as the first and second transparent elastomer layers, but pigmented with organic or inorganic colour pigments, e.g. titanium dioxide.

Finally, a glue layer (8) connecting the transfer (3) with the textile is printed. The glue layer consists of a mixture of a polyurethane which is a more softly adjusted one-component polyurethane having a melting point of 150–160° C., and a hot melt powder on copolyamide basis in the ratio 1:1. The melting point of the hot melt powder is about 115–130° C., and the grain size is not above 80 μm. A particularly suitable hot melt powder has been found to be a copolyamide on the basis of polymerized, predominantly dimerized fatty acids or their esters and substantially aliphatic diamines. These hot melts possess great resistance to washing and cleaning agents, even at high temperatures (80–90° C.).

The one-component polyurethane glue primarily serves as a filler for the powdered hot melt, but also serves per se as thermoplastics. For example, a 35% solution in dimethyl formamide/toluene/methyl ethyl ketone of a one-component polyurethane glue on the basis of polyester and aromatic diisocyanate having a plasticizing point of 150–160° C. is particularly useful for the purpose.

The glue layer serves as a purely reversible thermoplastic, i.e. no hardening or cross-linking takes place in the application of the transfer to the textile by means of heat and pressure. Under the action of heat and pressure in the application to the textile, both the hot melt and the one-component poyurethane melt and are pressed down between the textile fibres and thereby anchor the transfer mechanically.

EXAMPLE 1

A four-coloured pattern or image (5) of a two-component toner having a particle size of 6.4 μm was applied directly to the non-binding surface of a carrier sheet (1) in a Ricoh NC 5006 colour copier. Subsequently, a white-pigmented two-component polyurethane elastomer sheet (7) was applied on top of the toner image by silk screen printing. The two-component elastomer used was "Bargoscreen S18/50" polyurethane textile colour from Aaberg Druckfarben, Aaberg, Switzerland, admixed with 10% polydiisocyanate hardener. It is essential to the durability of the transfer that the toner resin has an extremely good contact with the white two-component polyuethane elastomer, so that common polymerization of the two materials takes place. As the heat fixing unit in the copier uses dimethyl polysiloxane silicone oil as a release agent on the heat rollers, small amounts of it will be transferred to the surface of the toner layer and thereby reduce the surface tension. It was therefore necessary to add a small amount of a wetting agent to the white-pigmented polyurethane elastomer to increase its wetting capacity, and 0.5% wetting agent of the brand "BYK 358" from BYK-Chemie GmbH, Wessel, Germany was added. The carrier sheet was fed through a tunnel drying oven in 105° C. hot air to dry the white layer before further processing. Then a transparent two-component polyurethane layer from the same series, "Bargoscreen S18/50", as the white layer was applied by silk screen printing, and while it was still wet, a layer of hot melt copolyamide granulate of the brand "Kiwomelt 2095 F" from Kissel & Wolf GmbH, Wiesloch, Germany, was added, forming the glue layer. The finished transfer was applied to a cotton/polyester textile at 165° C. at a pressure of 310 kPa in 10 seconds. This type of transfer is very versatile and is suitable for most types of textiles.

EXAMPLE 2

A transparent elastomer layer (4) of a linear one-component polyurethane on the basis of polyester and aliphatic diisocyanate was applied in a desired configuration by silk screen printing with a 34T blanket on a carrier sheet (1) consisting of a 105 $g/m^2$ sheet of paper (2), coated with a release layer of silicone (3). Then the carrier sheet with the applied elastomer layer was introduced into a Ricoh colour copier of the type NC5006, and a four-coloured pattern (5) of a two-component toner having a particle size of 6.4 $\mu$m was transferred within the area of the elastomer layer (4). A transparent elastomer layer (6) on the basis of the said one-component polyester urethane with the same configuration as the first elastomer layer was printed on top of the toner layer. Further, a titanium dioxide-pigmented white polyurethane layer (7) of the same structure as the preceding layers was printed. Finally, a glue layer (8) was printed, consisting of a mixture of a 35% solution in dimethyl formamide/toluene/methyl ethyl ketone of a one-component polyurethane glue on the basis of polyester and aromatic diisocyanate having a plasticizing point of 150–160° C. and a non-dissolved hot melt powder based on copolyamide. In this example, the individual elastomer layers were adjusted relatively softly, viz. with an ultimate/tensile strength of about 700–800%. Between the printing of the individual layers, elastomer layer, white cover layer and glue layer, these are dried in a hot air/infrared drying oven at 70–80° C., and the transfer is then dry, while the final hardening is completed only after about 10 hours at room temperature or 3–4 hours in a heating cabinet at 60° C. The finished transfer was transferred to a cotton/polyester textile at 180° C. and a pressure of 310 kPa in 10 seconds. This type of transfer is particularly suitable for textured elastic textiles.

EXAMPLE 3

Like in the preceding example, an elastomer layer (4), a toner layer (5), an elastomer layer (6), a white cover layer (7) and finally a glue layer (8) were printed successively on a carrier sheet (1) in the described manner. This time a polyurethane with a somewhat harder setting was used, viz. with an ultimate/tensile strength of 100–200%. The powdered hot melt was also the same as mentioned above. The transfer is applied to the textile in the same manner as in example 1. Such a setting is suitable particularly for non-elastic woven textiles for work clothes.

Conclusively, the described transfer material, according to the field of use, may be adapted for various textiles, as the various elastomer layers may have a soft or a hard setting and thereby affect the elasticity and the resistance to temperatures and mechanical conditions.

Of course, it is possible to modify and vary the product of the invention within the scope of the invention. Thus, e.g. a silicone-coated plastics sheet may be used instead of paper as a carrier sheet. Further, it is also possible to omit the white cover layer if the transfer is just used on white textiles and to apply a transparent elastomer layer on the colour toner layer and then the glue layer. Moreover, while the white cover layer (7) or the last transparent elastomer layer (6) is still wet, it may also be decided to apply to said layer a layer of hot melt powder which is fused into the elastomer in an infrared/hot air drying oven. This method saves a printing operation, but the transfer has a somewhat harder appearance on the textile. Finally, the white cover layer may be printed directly on the toners, thereby allowing the one elastomer layer to be omitted. However, this variation can be used only where a textile having a very even non-textured surface is involved, since, otherwise, the white elastomer will pull the toners apart during the application and thereby create a more blurred image.

What is claimed is:

1. A transfer capable of applying one- or multi-coloured patterns to textiles under heat and pressure, wherein the transfer comprises a carrier sheet (1) having a non-binding surface which carries (a) a one- or multi-coloured pattern (5) printed on the carrier sheet a digitally controlled colour printer, (b) a transparent (6) or white-pigmented (7) elastomer layer of a polymer having a high plasticizing point printed configuratively on the pattern (5); and (c) a heat-activatable thermoplastic polymeric glue layer (8) printed configuratively on the transparent (6) or white-pigmented (7) elastomer layer, or a heat-activatable hot melt granulate sprinkled on the elastomer layer while this was still wet.

2. A transfer capable of applying one- or multi-colored patterns to textiles under heat and pressure, wherein the transfer comprises:

a carrier sheet having a non-binding surface;

a first transparent elastomer polymer layer printed configuratively on the carrier sheet, said elastomer polymer having a plasticizing point that is above the envisaged application temperature of the final transfer; a one- or multicolored pattern printed on top of the first transparent elastomer polymer layer by means of a digitally controlled color printer using a colorant composition adapted for use in such printer;

a second transparent or white-pigmented elastomer polymer layer printed configuratively on top of said pattern and forming a hardened homogeneous unit with said colorant composition in the one- or multi-colored pattern, said elastomer polymer having a plasticizing point that is above the envisaged application temperature of the final transfer; and a heat-activatable thermoplastic polymeric glue layer printed configuratively on the second transparent or white-pigmented elastomer layer, or a heat-activatable hot melt granulate sprinkled on the elastomer layer while said elastomer layer was still wet.

3. The transfer of claim 2, wherein the carrier sheet comprises paper or a heat-resistant plastic sheet coated with a thin layer of silicone or polyolefin.

4. The transfer of claim 2, wherein the carrier sheet is a polyolefin sheet.

5. The transfer of claim 4, wherein the polyolefin sheet comprises polypropylene.

6. The transfer of claim 2, wherein the second elastomer polymer layer comprises both a transparent elastomer polymer layer printed on top of the colored pattern and a white-pigmented elastomer polymer layer printed on top of said transparent elastomer polymer layer.

7. The transfer of claim 2, wherein the transparent elastomer polymer layers comprise an elastomer polyurethane applied in the form of a solution in an organic solvent.

8. The transfer of claim 2, wherein the white-pigmented elastomer polymer layer comprises an elastomer polyurethane which is pigmented with a white inorganic pigment, applied in the form of a solution in an organic solvent with dispersed pigment.

9. The transfer of claim 2, wherein the transparent elastomer polymer layers comprise an elastomer polyurethane applied in the form of an aqueous solution.

10. The transfer of claim 2, wherein the white-pigmented elastomer polymer layer comprises an elastomer polyurethane which is pigmented with a white inorganic pigment, applied in the form of an aqueous solution with dispersed pigment.

11. The transfer of claim 2, wherein the glue layer comprises polyurethane thermoplastics having a plasticizing point in the range of 120–160° C. containing dispersed a hot melt powder of copolyamide or high density polyethylene having a melting point in the range of 100–140° C. in the ratio 1:1, applied in the form of an organic solution of said polyurethane thermoplastics having said hot melt powder dispersed.

12. The transfer of claim 2, wherein the glue layer comprises polyurethane thermoplastics having a plasticizing point in the range of 120–160° C. containing dispersed a hot melt powder of copolyamide or high density polyethylene having a melting point in the range of 100–140° C. in the ratio 1:1, applied in the form of an aqueous solution of said polyurethane thermoplastics having said hot melt powder dispersed.

13. The transfer of claim 2, wherein the transparent elastomer polymer layers, the white-pigmented elastomer polymer layer and the glue layer are printed on the carrier sheet by silk screen printing processes.

14. The transfer of claim 2 wherein the elastomer polymer has a plasticizing point above 165° C.

15. The transfer of claim 2, wherein the elastomer polymer comprises a linear, fully reacted polyurethane on the basis of polyester.

16. The transfer of claim 2, wherein said one- or multi-colored pattern consists of a colorant composition printed on the carrier sheet by means of a digitally controlled dry electrostatic color toner printer using thermoplastic powder color toners.

17. The transfer of claim 2, wherein said one- or multi-colored pattern consists of a colorant composition printed on the carrier sheet by means of a digitally controlled thermotransfer color print using thermoplastic color toners.

18. The transfer of claim 2, wherein said one- or multi-colored pattern consists of a colorant composition printed on the carrier sheet by means of an ink jet printer using liquid dye.

19. A transfer capable of applying one- or multi-coloured patterns to textiles under heat and pressure, wherein the transfer comprises a carrier sheet (1) having a non-binding surface which carries (a) a first transparent elastomer layer (4) of a polymer having a high plasticizing point printed configuratively on the carrier sheet (1);

(b) a one- or multi-coloured pattern (5) printed on the first elastomer layer (4) using a digitally controlled colour prints;

(c) a second transparent (6) or white-pigmented (7) elastomer layer of a polymer having a high plasticizing point printed configuratively on the pattern (5); and (d) a heat-activatable thermoplastic polymeric glue layer (8) printed configuratively on the transparent (6) or white-pigmented (7) elastomer layer, or a heat-activatable hot melt granulate sprinkled on the elastomer layer while this was still wet.

20. A transfer capable of applying one- or multi-coloured patterns to textiles under heat and pressure, wherein the transfer comprises a carrier sheet (1) having a non-binding surface which carries (a) a first transparent elastomer layer (4) of a polymer having a high plasticizing point printed configuratively on the carrier sheet;

(b) a one- or multi-coloured pattern (5) printed on the elastomer layer (4) using a digitally controlled colour printer;

(c) a second transparent elastomer layer (6) of a polymer having a high plasticizing point printed configuratively on the pattern (5);

(d) a white-pigmented elastomer layer (7) of a polymer having a high plasticizing point printed configuratively on the second transparent elastomer layer (6); and (e) a heat-activatable thermoplastic polymeric glue layer (8) printed configuratively on the white elastomer layer (7) or a heat-activatable hot melt granulate sprinkled on the elastomer layer while this was still wet.

21. A transfer according to claim 1, when the carrier sheet (1) consists of paper or a heat-resistant plastic sheet coated with a thin layer of silicone or polyolefin.

22. A transfer according to claim 1, wherein the carrier sheet (1) is a polyolefin sheet.

23. A transfer according to claim 22, wherein the polyolefin sheet consists of high density polypropylene.

24. A transfer according to claim 1, wherein the transparent elastomer layers consist of an elastomer polyurethane having a high plasticizing point applied in the form of a solution in an organic solvent.

25. A transfer according to claim 1, wherein the white elastomer layer (7) consists of an elastomer polyurethane having a high plasticizing point which is pigmented with a white inorganic pigment, applied in the form of a solution in an organic solvent.

26. A transfer according to claim 1, wherein the transparent elastomer layers consist of an elastomer polyurethane having a high plasticizing point applied in the form of an aqueous solution.

27. A transfer according to claim 1, wherein the white elastomer layer (7) consists of an elastomer polyurethane having a high plasticizing point which is pigmented with a white inorganic pigment, applied in the form of an aqueous solution.

28. A transfer according to claim 1, wherein the glue layer (8) consists of polyurethane thermoplastics having a plasticizing point in the range 120–160° C. containing dispersed fine particles of a hot melt of copolyamide or high density polyethylene type having a melting point of 100–140° C. in the ratio 1:1, applied in the form of a solution of the polyurethane in an organic solvent with dispersed hot melt powder.

29. A transfer according to claim 1, wherein the glue layer (8) consists of polyurethane thermoplastics having a plasticizing point in the range 120–160° C. containing dispersed fine particles of a hot melt of copolyamide or high density polyethylene type having a melting point of 100–140° C. in the ratio 1:1, applied in the form of an aqueous solution of the polyurethane with dispersed hot melt powder.

30. A transfer according to claim 1, wherein the transparent elastomer layers, the white elastomer layer (7) and the glue layer (8) are printed on the carrier sheet (1) by silk screen printing processes in the same register and configuration on top of one another.

31. A transfer according to claim 1, wherein the coloured pattern (5) is printed on the carrier sheet (1) or the first transparent elastomer layer (4) by mans of a dry electrostatic colour toner printer, an ink jet printer with liquid dye or a thermotransfer colour printer, all of which are digitally controlled.

* * * * *

US006872443C1

(12) EX PARTE REEXAMINATION CERTIFICATE (9421st)

United States Patent

Franke

(10) Number: US 6,872,443 C1

(45) **Certificate Issued: *Nov. 26, 2012**

(54) TRANSFER FOR DECORATING TEXTILES WITH COLORED PATTERNS

(75) Inventor: Kell Erik Franke, Copenhagen (DK)

(73) Assignee: Reflex Holding A/S, Drammen (NO)

Reexamination Request:
No. 90/011,912, Sep. 20, 2011

Reexamination Certificate for:

| | |
|---|---|
| Patent No.: | **6,872,443** |
| Issued: | **Mar. 29, 2005** |
| Appl. No.: | **10/326,319** |
| Filed: | **Dec. 20, 2002** |

( * ) Notice: This patent is subject to a terminal disclaimer.

Related U.S. Application Data

(62) Division of application No. 09/091,704, filed as application No. PCT/DK96/00535 on Dec. 16, 1996, now Pat. No. 6,521,327.

(30) Foreign Application Priority Data

Dec. 14, 1995 (DK) ....................................... 1417/95

(51) Int. Cl.

| | |
|---|---|
| ***D06Q 1/12*** | (2006.01) |
| ***D06P 5/24*** | (2006.01) |
| ***B44C 1/17*** | (2006.01) |
| ***D06Q 1/00*** | (2006.01) |

(52) U.S. Cl. ..................... 428/201; 428/423.1; 428/480; 428/500

(58) Field of Classification Search ........................ None
See application file for complete search history.

(56) References Cited

To view the complete listing of prior art documents cited during the proceeding for Reexamination Control Number 90/011,912, please refer to the USPTO's public Patent Application Information Retrieval (PAIR) system under the Display References tab.

*Primary Examiner* — Terrence Till

(57) ABSTRACT

A transfer capable of applying one- or multi-colored patterns to textiles under heat and pressure comprises a carrier sheet (1) having a non-binding surface which carries (a) a one- or multi-colored pattern (5) printed on the carrier sheet using a digitally controlled color printer;

(b) a transparent (6) or white-pigmented (7) elastomer layer of a polymer having a high plasticizing point printed configuratively on the pattern (5); and (c) a heat-activatable thermoplastic polymeric glue layer (8) printed configuratively on the transparent (6) or white-pigmented (7) elastomer layer or a heat-activatable hot melt granulate sprinkled on the elastomer layer while said layer was still wet.

An even better encapsulation of the colored pattern is obtained when the carrier sheet has printed thereon a first transparent elastomer layer of a polymer having a high plasticizing point, and the pattern is printed on this elastomer layer using a digitally controlled color printer. Additional strength is obtained when both a transparent elastomer layer and a white-pigmented elastomer layer are printed on top of the colored pattern.

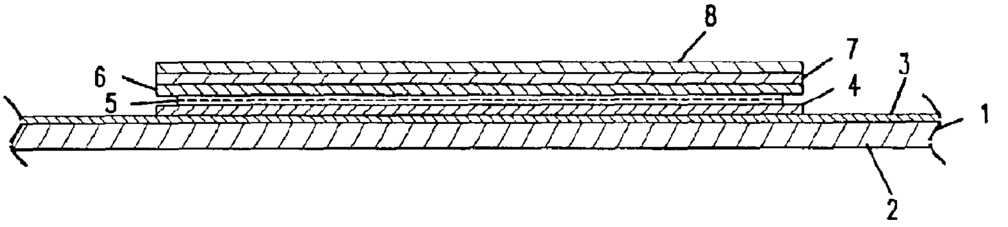

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-20 is confirmed.

Claim 1 is determined to be patentable as amended.

Claims 21-31, dependent on an amended claim, are determined to be patentable.

New claims 32-34 are added and determined to be patentable.

1. A transfer capable of applying one- or multi-coloured patterns to textiles under heat and pressure, wherein the transfer comprises a carrier sheet (1) having a non-binding surface which carries (a) a one- or multi-coloured pattern (5) printed on the carrier sheet *using* a digitally controlled colour printer, (b) a transparent (6) or white-pigmented (7) elastomer layer of a polymer having a high plasticizing point printed configuratively on the pattern (5); and (c) a heat-activatable thermoplastic polymeric glue layer (8) printed configuratively on the transparent (6) or white-pigmented (7) elastomer layer, or a heat-activatable hot melt granulate sprinkled on the elastomer layer while this was still wet.

*32. A transfer according to claim 1, wherein the polymer having a high plasticizing point comprises an elastomeric polyurethane.*

*33. A transfer according to claim 32, wherein the elastomeric polyurethane comprises polyester and aliphatic diisocyanate or aromatic diisocyanate.*

*34. A transfer according to claim 33, further comprising wherein color toners based on thermoplastic polyol resins are present in the surface of said transparent or white pigmented elastomer layer and are hardened together with said transparent or white pigmented elastomer layer under the action of the aliphatic diisocyanate or aromatic diisocyanate to the form a homogenous unit.*

* * * * *